United States Patent [19]

Hirai et al.

[11] 4,297,888

[45] Nov. 3, 1981

[54] STABILITY CONTROL SYSTEM FOR VIBRATION TEST DEVICE

[75] Inventors: Hiromu Hirai, Yatabemachi; Shin Hamano, Shimoinayoshi, both of Japan

[73] Assignee: Hitachi, Ltd., Tokyo, Japan

[21] Appl. No.: 124,958

[22] Filed: Feb. 26, 1980

[30] Foreign Application Priority Data

Feb. 28, 1979 [JP] Japan .................................. 54-21857

[51] Int. Cl.³ ............................................ G01N 29/00
[52] U.S. Cl. ..................................................... 73/664
[58] Field of Search .................. 73/664, 662, 663, 665

[56] References Cited

U.S. PATENT DOCUMENTS 3,068,418 12/1962 Hajian ...................................... 73/664
3,087,328 4/1963 Ross ........................................ 73/664
3,800,588 4/1974 Larson et al. .......................... 73/664

*Primary Examiner*—Stephen A. Kreitman

*Attorney, Agent, or Firm*—Craig and Antonelli

[57] ABSTRACT

A stability control system for a vibration test device having an acceleration control system and using an electro-hydraulic servo-system is disclosed. The stability control system comprises a model operation circuit which simulates a model response corresponding to value representing the states of a vibration table in response to command signals produced from a signal generator and associated with the displacement, velocity and acceleration of the table, and a gain-adjusting circuit which produces gain-adjusting signals to gain-adjusting sections in response to model response signals produced from the model operation circuit, state-representing signals produced from a feedback circuit and the command signals produced from the signal generator. The gain of each gain-adjusting section is automatically controlled in such a manner that the state-representing values of the parts of the control system coincide with the corresponding state-representing values in the model operation circuit.

3 Claims, 5 Drawing Figures

STABILITY CONTROL SYSTEM FOR VIBRATION TEST DEVICE

BACKGROUND OF THE INVENTION

1. Field of the Invention

This invention relates to a system for stably controlling an earthquake resistance test or vibration tolerance test device using an electro-hydraulic servosystem.

2. Description of the Prior Art

An example of a vibration test device for testing the earthquake resistance of a structure is disclosed, for example, in U.S. Pat. No. 3,800,588. In the disclosed vibration test device, a structure to be tested is placed on a vibration table which is vibrated to thereby conduct an earthquake resistance test of the structure. A control system of the vibration test device of this type generally constitutes a displacement control system. The configuration and operation of this control system will be briefly described hereunder. The displacement waveform to be reproduced by the vibration table is applied in the form of a voltage signal. This displacement command or input signal is compared with a voltage signal converted from the actual displacement of the vibration table by a detector. The resulting difference, i.e., a control error or deviation is amplified in the form of a current by a servo-amplifier and applied to a servo-valve. In response to this input current, the servo-valve regulates the direction and flow rate of the pressurized fluid supplied to an actuator for driving the vibration table. In this way, the vibration table is driven in a direction to reduce the control error.

In view of the fact that the standards for an earthquake resistance of a structure have been recently established on the basis of the magnitude of acceleration, however, in the vibration or earthquake resistance test device an acceleration control system using an acceleration waveform as a main input signal is used as the control system thereof.

In such a conventional vibration test device having an acceleration control system including an electrohydraulic servo-system, the output waveform of the vibration table is affected by the respective gains of gain-adjusting sections provided in a feedback circuit and an input circuit in the control system. In order to maintain an optimum condition of the output waveform of the vibration table, therefore, it is necessary to adjust the respective values of the gain-adjusting sections. In conventional systems, this adjustment is made manually. This makes an optimum adjustment difficult because of the increased number of parts to be adjusted. Further, the optimum value of each of the gain-adjusting sections varies with the weight of the test object such as a structure placed on the vibration table, and therefore a readjustment is necessary each time a test object of a different weight is placed on the vibration table.

SUMMARY OF THE INVENTION

Accordingly, it is an object of the present invention to provide a stability control system for a vibration test device, in particular for a vibration test device having an acceleration control system, in which an electro-hydraulic servo-system is adjusted at an optimum condition in accordance with the variations in the vibration-related conditions of an object to be tested by the vibration test device, or more specifically, in which the values of the gain-adjusting sections are automatically set in accordance with the change in weight of an object to be tested, thereby, attaining the stability of the control system.

Another object of the present invention is to provide a stability control system for a vibration test device, in which the gain adjusting operation may easily be attained.

To achieve the above-mentioned objects of the present invention, there is provided a stability control system for use in a vibration test device comprising a vibration table, a vibrator for driving the vibration table, a servo-valve for controlling the direction and flow rate of pressurized fluid supplied to the vibrator, a servo-amplifier for poweramplifying a voltage signal applied thereto and applying the amplified signal to the servo-valve in the form of a current signal, signal generator means for producing command voltage signals representing target values corresponding to states of the vibration table including the displacement, velocity and acceleration thereof, a feedback circuit for converting into state-representing voltage signals feedback elements representing the states of selected one of the vibration table and the vibrator including the displacement and at least one of the velocity and acceleration of the selected one of the vibration table and the vibrator, and an adder for calculating the sum of the command voltage signals produced from the signal generator means and the state-representing voltage signals produced from the feedback circuit and for applying an output voltage signal representing the sum to the servo-amplifier. The stability control system comprises a first gain-adjusting means provided at the input side of the adder, a second gain adjusting means provided at the output side of the feedback circuit, a model operation circuit for simulating a model response corresponding to the state-representing values of the vibration table in response to the command voltage signals produced from the signal generator means so as to produce model response signals, and a gain-adjusting circuit for applying gain control signals to the first and second gain-adjusting means in response to the model response signals produced from the model operation circuit, the state-representing voltage signals produced from the feedback circuit and the command voltage signals produced from the signal generator means, whereby the gains of the first and second gain-adjusting means being automatically controlled in such a manner that the state-representing values of the parts of the control system coincide with the corresponding state-representing values in the model operation circuit.

DESCRIPTION OF THE PREFERRED EMBODIMENTS

Figure 1:
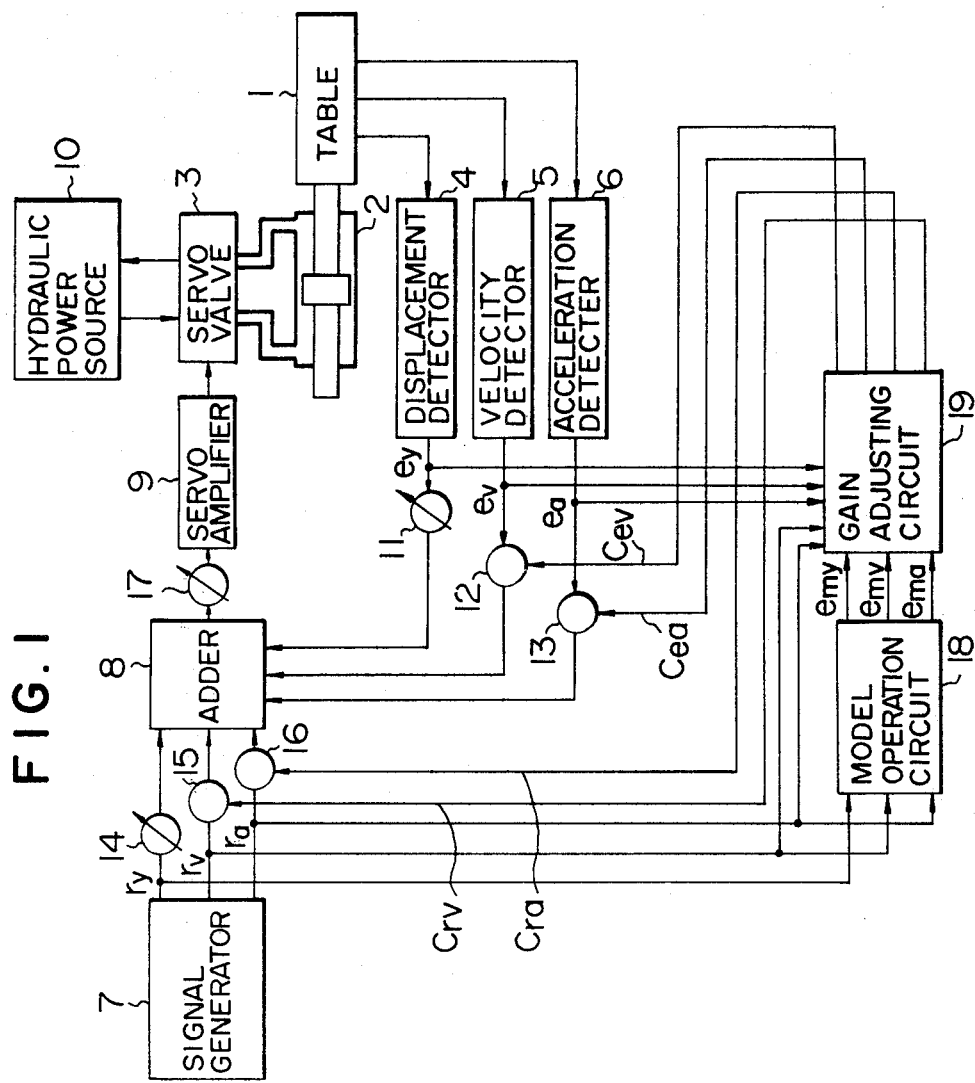
FIG. 1 is a diagram showing a configuration of a vibration test device provided with an embodiment of the stability control system according to the present invention.

The diagram of FIG. 1 shows a configuration of a vibration test device provided with an example of the control system according to the present invention. In this drawing, a vibration table 1 is supported on a base (not shown) by a hydraulic floating device (not shown) using a hydro-static bearing (not shown). The sides of the vibration table 1 are guided by a hydraulic side guide (not shown) using a hydro-static bearing (not shown) in order that the direction of motion of the vibration table 1 may coincide with that of a vibrator 2. The vibrator 2 is coupled to the vibration table 1 through a clamp (not shown). A servo-valve 3 is directly mounted on the vibrator 2 to reduce the length of the piping connection therebetween. The vibrator 2 or the vibration table 1 is provided with a displacement detector 4, a velocity detector 5 and an acceleration detector 6 (which may be replaced by or used in addition to means for detecting the differential pressure of the vibrator). A command to the vibration table 1 is given in the form of an electrical signal including a displacement command signal $r_y$, a velocity command signal $r_v$ and an acceleration command signal $r_a$ from a signal generator 7. The actual displacement, velocity and acceleration of the vibration table 1, on the other hand, are detected in the form of voltage signals $e_y$, $e_v$ and $e_a$ respectively by the detectors 4 to 6. These detection signals $e_y$, $e_v$ and $e_a$ are fed back to an adder 8 where they are compared with the displacement command signal $r_y$, the velocity command signal $r_v$ and the acceleration command signal $r_a$, respectively. The differences therebetween are applied as a control error to a servo-amplifier 9 for power amplification and then applied to the servo-valve 3. In response to this control error signal applied thereto, the servo-valve 3 controls the direction and flow rate of the pressurized fluid supplied from a hydraulic power source 10 to the vibrator 2, thereby driving the vibration table 1 in such a direction as to reduce the control error. In this way, the vibration table 1 is driven as commanded.

The displacement detector 4, the velocity detector 5 and the acceleration detector 6 are provided with a displacement feedback gain-adjusting section 11, a velocity feedback gain-adjusting section 12 and an acceleration feedback gain-adjusting section 13 respectively at their respective outputs. The signal generator 7 is provided at its three outputs with a gain-adjusting section 14 for the displacement command signal $r_y$, a gain-adjusting section 15 for the velocity command signal $r_v$ and a gain-adjusting section 16 for the acceleration command signal $r_a$ respectively. Further, the adder 8 is provided at its output with a gain-adjusting section 17.

With reference to this embodiment, explanation will be made with respect to the case where the velocity feedback gain-adjusting section 12, the acceleration feedback gain-adjusting section 13, the velocity command signal gain-adjusting section 15 and the acceleration command signal gain-adjusting section 16 are to be the object to be adjusted because they are frequently used and effective in gain control in the vibration test device shown in FIG. 1.

Figure 2:
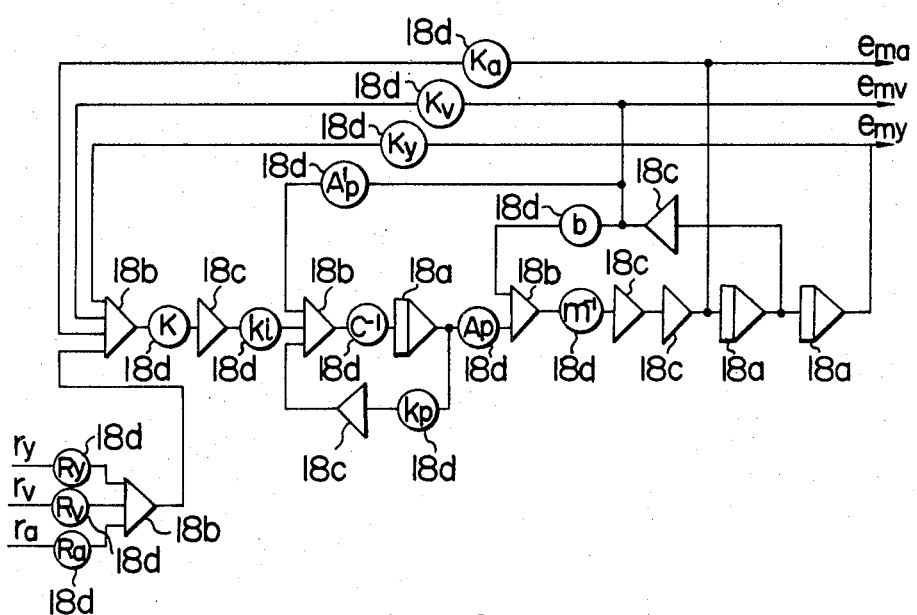
FIG. 2 shows an embodiment of a model operation circuit used in the present invention.

These gain-adjusting sections 12, 13, 15 and 16 use elements such as multipliers having a multiplication function. Reference numeral 18 shows a model operation circuit, and numeral 19 a gain-adjusting circuit. The model operation circuit 18 is an electrical circuit for simulating the desirable response of the vibration table 1. This model operation circuit 18 comprises, for instance, a plurality of integrators 18a, adders 18b, inverters 18c and coefficient circuits 18d as shown in FIG. 2. The values listed below which are associated with the actual characteristics of the component parts of the vibration test device are set in each of the coefficient circuits 18d.

K: Gain of the servo-amplifier 9 (mA/V)

$k_1$: Flow rate gain of the servo-valve 3 (cm$^3$/s.mA)

c: Constant representing the rigidity of the driving system (cm$^5$/kg)

$k_p$: Reduction rate of the output flow rate due to internal leakage of the servo-valve 3 (cm$^5$/s.kg)

Ap: Sectional area of the piston of the vibrator 2 (cm$^2$)

m: Mass of the moving part associated with the vibration table 1 (kg.s$^2$/cm)

b: Coefficient of viscous friction (kg.s/cm)

$K_y$: Feedback gain of displacement (V/cm)

$K_v$: Feedback gain of velocity (V.s/cm)

$K_a$: Feedback gain of acceleration (V.s$^2$/cm)

$R_y$: Input gain of displacement command signal $r_y$ $R_v$: Input gain of velocity command signal $r_v$ $R_a$: Input gain of acceleration command signal $r_a$ The model operation circuit 18 constructed as mentioned above calculates and produces the model displacement, model velocity and model acceleration in the form of voltage signals $e_{my}$, $e_{mv}$ and $e_{ma}$ respectively.

Figure 3:
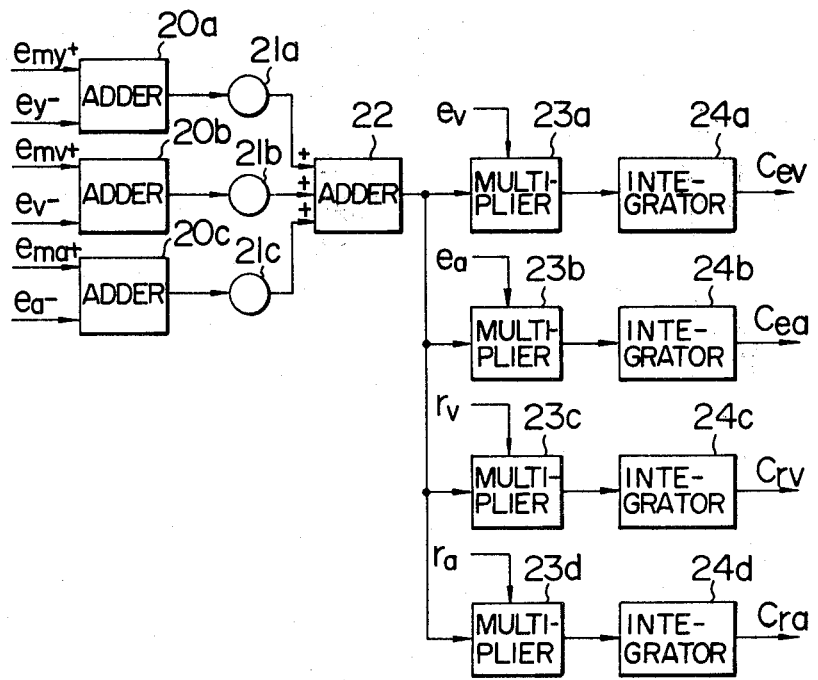
FIG. 3 is a diagram showing the configuration of an embodiment of a gain-adjusting circuit used in the stability control system according to the present invention.

The gain-adjusting circuit 19 comprises, for example, adders 20a to 20c, coefficient circuits 21a to 21c, an adder 22, multipliers 23a to 23d and integrators 24a to 24d as shown in FIG. 3. This gain-adjusting circuit 19 produces a velocity feedback gain-adjusting signal $C_{ev}$, an acceleration feedback gain-adjusting signal $C_{ea}$, a gain-adjusting signal $C_{rv}$ for the velocity command signal $r_v$ from the signal generator 7, and a gain-adjusting signal $C_{ra}$ for the acceleration command signal $r_a$ from the same signal generator 7, in response to the displacement signal $e_y$, the velocity signal $e_v$ and the acceleration signal $e_a$ which are produced from the respective detectors 4 to 6, the model displacement signal $e_{my}$, the model velocity signal $e_{mv}$ and the model acceleration signal $e_{ma}$ which are produced from the model operation circuit 18, and the velocity input signal $r_v$ and the acceleration input signal $r_a$ which are produced from the signal generator 7. These signals $C_{ev}$, $C_{ea}$, $C_{rv}$ and $C_{ra}$ are applied to the velocity feedback gain-adjusting section 12, the acceleration feedback gain-adjusting section 13, the velocity command signal ($r_v$) gain-adjusting section 15 and the acceleration command signal ($r_a$) gain-adjusting section 16 of the vibration test device, thereby adjusting these gains.

The operation of this gain-adjusting circuit 19 will be explained below more in detail with reference to FIG. 3. Errors between the model displacement signal $e_{my}$ and the vibration table actual displacement signal $e_y$, between the model velocity signal $e_{mv}$ and the vibration table actual velocity signal $e_v$, and between the model acceleration signal $e_{ma}$ and the vibration table actual acceleration signal $e_a$ are produced from the adders 20a to 20c respectively. These three error signals are adjusted to proper values by the coefficient circuits 21a to 21c respectively and then added to each other at the adder 22. The signal produced from this adder 22 is multiplied by the vibration table actual velocity signal $e_v$ at the multiplier 23a, by the vibration table actual acceleration signal $e_a$ at the multiplier 23b, by the velocity command signal $r_v$ from the signal generator 7 at the multiplier 23c, and by the acceleration command signal $r_a$ from the same signal generator 7 at the multiplier 23d. The output signals from the multipliers 23a to 23d are integrated at the integrators 24a to 24d respectively and produced in the form of the velocity feedback gain-adjusting signal $C_{ev}$, the acceleration feedback gain-adjusting signal $C_{ea}$, the gain-adjusting signal $C_{rv}$ for the velocity command signal $r_v$ and the gain-adjusting signal $C_{ra}$ for the acceleration command signal $r_a$ respectively. The algorithm of the gain-adjusting signal generator circuit in this gain-adjusting circuit may be determined by what is called the model adaptive control system which is designed while compensating for the stability of the gain-adjusting system utilizing the Lyapunov function.

Figure 4:
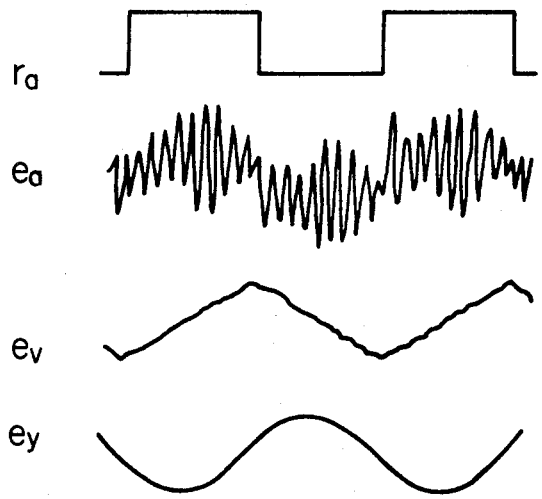
FIG. 4 shows response characteristics of a conventional vibration test device.
Figure 5:
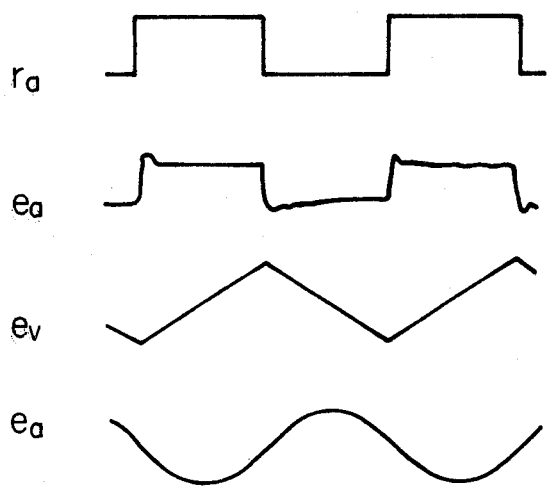
FIG. 5 shows response characteristics of a vibration test device to which the stability control system according to the present invention is applied.

According to the construction as described above, the gain-adjusting sections 12, 13, 15 and 16 adjust the respective gains in such a manner that the state-representing values of the vibration table 1 coincide with those of the model operation circuit 18, thereby improving the operating efficiency of the gain-adjusting sections 12, 13, 15 and 16 and the control performance of the vibration test device. The fact that the control performance is improved according to the present invention will be explained below with reference to FIGS. 4 and 5. FIG. 4 shows response characteristics of a prior art vibration test device to which the present invention is not applied, and FIG. 5 shows response characteristics of a vibration test device to which the present invention is applied. These diagrams show the response of the acceleration signal $e_a$, the velocity signal $e_v$ and the displacement signal $e_y$ which were detected at the vibration table 1 under the condition that an acceleration command signal $r_a$ in a rectangular waveform was applied thereto. It will be seen from FIG. 4 that if the control system according to the present invention is not used, the response of the vibration table 1 is so oscillatory that the vibration test device is not good for use. This condition is often caused depending on the weight of the test object. According to the present invention, by contrast, it will be apparent from FIG. 5 that the vibration table 1 has very stable response characteristics.

The above-mentioned embodiment concerns the automatic control of the gain-adjusting sections whose operations are frequently required on the one hand and are very effective on the other hand. Other gain-adjusting sections may also be adjusted in the same manner as described above.

As mentioned in detail above, according to the present invention, the main control parameters of the vibration test device are capable of being automatically adjusted, thereby improving the operating efficiency of gain adjustment as compared with the prior art systems. Further, according to the present invention, the gain of the control system is always adjusted at an optimum value, thereby improving the control performance of the vibration test device.

We claim:

1. In a vibration test device comprising a vibration table, a vibrator for driving said vibration table, a servo-valve for controlling the direction and the flow rate of pressurized fluid supplied to said vibrator, a servo-amplifier for power-amplifying a voltage signal applied thereto and applying the amplified signal to said servo-valve in the form of a current signal, signal generator means for producing command voltage signals representing target values corresponding to states of said vibration table including the displacement, velocity and acceleration thereof, a feedback circuit for converting into state-representing voltage signals feedback elements representing the states of selected one of said vibration table and said vibrator, said states including the displacement and at least one of the velocity and acceleration of said selected one of said vibration table and said vibrator, and an adder for calculating the sum of said command voltage signals produced from said signal generator means and said state-representing voltage signals produced from said feedback circuit and for applying an output voltage signal representing said sum to said servo-amplifier; a stability control system comprises a first gain-adjusting means provided at the input side of said adder, a second gain-adjusting means provided at the output side of said feedback circuit, a model operation circuit for simulating a model response corresponding to the state-representing values of said vibration table in response to said command voltage signals produced from said signal generator means so as to produce model response signals, and a gain-adjusting circuit for applying gain-adjusting signals to said first and second gain-adjusting means in response to said model response signals produced from said model operation circuit, said state-representing voltage signals produced from said feedback circuit and said command voltage signals produced from said first generator means.

2. A stability control system according to claim 1, wherein said first gain-adjusting means includes a first gain-adjusting section for the velocity command voltage signal produced from said signal generator means and a second gain-adjusting section for the acceleration command voltage signal produced from said signal generator means, and wherein said second gain-adjusting means includes a third gain-adjusting section for velocity feedback and a fourth gain-adjusting section for acceleration feedback, said gain-adjusting signals including gain-adjusting signals respectively applied to said first, second, third and fourth gain-adjusting sections.

3. A stability control system according to claim 1, wherein said second gain-adjusting means includes a first gain-adjusting section for velocity feedback and a second gain-adjusting section for acceleration feedback, said gain-adjusting signals including gain-adjusting signals respectively applied to said first and second gain-adjusting sections.

* * * * *